(12) United States Patent
Collins

(10) Patent No.: US 10,328,962 B2
(45) Date of Patent: Jun. 25, 2019

(54) INSULATED STORAGE SYSTEM

(71) Applicant: Chad Anthony Collins, Temple, TX (US)

(72) Inventor: Chad Anthony Collins, Temple, TX (US)

(*) Notice: Subject to any disclaimer, the term of this patent is extended or adjusted under 35 U.S.C. 154(b) by 167 days.

(21) Appl. No.: 15/265,283

(22) Filed: Sep. 14, 2016

(65) Prior Publication Data

US 2017/0129685 A1 May 11, 2017

Related U.S. Application Data

(60) Provisional application No. 62/285,794, filed on Nov. 9, 2015.

(51) Int. Cl.
*B62B 5/00* (2006.01)
*B62B 1/00* (2006.01)
*B60D 1/58* (2006.01)

(52) U.S. Cl.
CPC .............. *B62B 5/0079* (2013.01); *B60D 1/58* (2013.01); *B62B 1/008* (2013.01); *B62B 2206/006* (2013.01)

(58) Field of Classification Search
CPC .......................... B65D 81/3802; B60D 1/145
USPC ............ 224/511, 442, 493, 495, 42.13, 546; 180/7.1
See application file for complete search history.

(56) References Cited

U.S. PATENT DOCUMENTS

| | | | |
|---|---|---|---|
| 1,850,500 A | 3/1932 | Goble | |
| 2,494,289 A | 1/1950 | Di Bari | |
| 2,684,580 A | 7/1954 | Sniader et al. | |
| 3,373,617 A | 3/1968 | Lässig | |
| 3,777,835 A * | 12/1973 | Bourne | A63B 19/02 180/10 |
| 3,837,308 A | 9/1974 | Harvey et al. | |
| 3,905,323 A * | 9/1975 | Kacere | B60F 3/00 114/39.23 |
| 4,386,787 A * | 6/1983 | Maplethorpe | A63G 29/02 180/10 |
| 4,908,049 A | 3/1990 | Yoshida et al. | |
| 6,298,934 B1 * | 10/2001 | Shteingold | B62D 55/04 180/10 |
| 6,513,690 B1 * | 2/2003 | Churchill | B60R 9/06 224/404 |
| 6,702,050 B1 * | 3/2004 | Mazhar | B62D 55/07 180/10 |
| D493,673 S * | 8/2004 | Moffett, III | D7/605 |
| 7,963,350 B1 * | 6/2011 | Thielman | B62D 57/00 180/7.1 |
| 8,393,486 B2 * | 3/2013 | Cap | B65D 88/36 220/216 |
| 8,499,862 B2 * | 8/2013 | Mondl | A63G 29/02 180/7.1 |
| 8,641,411 B2 * | 2/2014 | Crawley | F01N 3/0256 422/187 |
| 8,689,495 B2 * | 4/2014 | Hill | E04H 9/028 52/79.1 |

(Continued)

*Primary Examiner* — Derek J Battisti

(74) *Attorney, Agent, or Firm* — Christopher & Weisberg, P.A.

(57) ABSTRACT

An insulated container configured to store cold consumables is disclosed. The container has a body having a curved track wrapping around the body and upon which the body is able to be rolled. The body has an insulated wall encompassing a cavity configured to hold at least ice and consumables.

14 Claims, 12 Drawing Sheets

(56) References Cited

U.S. PATENT DOCUMENTS

| | | | |
|---|---|---|---|
| 9,481,414 B1* | 11/2016 | Thielman | F41A 23/28 |
| 2010/0132828 A1 | 6/2010 | Stelzl | |
| 2015/0217161 A1* | 8/2015 | Taylor | A63B 23/0222 |
| | | | 482/132 |

* cited by examiner

INSULATED STORAGE SYSTEM

CROSS-REFERENCE TO RELATED APPLICATION

This application is related to and claims priority to U.S. Provisional Patent Application Ser. No. 62/285,794, filed Nov. 9, 2015, entitled "COOLER BALL SYSTEM", the entirety of which is incorporated herein by reference.

TECHNICAL FIELD

Towable insulated storage systems.

SUMMARY

Some embodiments advantageously provide a container configured to store consumables. The container may be insulated and configured to store hot or cold consumables. In some embodiments, the container has a body having an insulated wall that encompasses a cavity, the cavity configured to hold consumables. A curved track is configured to wrap around the body and upon which the body is able to be rolled. In some embodiments, the curved track is one of spherical and ellipsoidal. In some embodiments, the curved track includes a curved band wrapping around the body, the circular band having interior gear teeth that mate with teeth of a plurality of interior gears attached to the container. In some embodiments, the container further includes a first hatch openable to load and unload the container; and a second hatch smaller than the first hatch and openable to retrieve consumables from the cavity. In some embodiments, the second hatch has recesses to receive fingers of a hand to enable opening of the second hatch. In some embodiments, the container further includes a leash attachable to the container and configured to pull the container so that the container rolls on the curved track. In some embodiments, the leash has a first end attachable to the container, a second end opposite the first end and having an actuator, and an air conduit along a length of the leash, the actuator facilitating sending a pulse of air through the air conduit and wherein the container further comprises a braking mechanism actuated by the pulse of air to brake the container.

In some embodiments, the container further includes retractable feet extending from the body upon which the container rests when the retractable feet are extended. In some embodiments, the retractable feet are extendible and retractable by operation of at least one lever. In some embodiments, the body is configured to float in water. In some embodiments, the body has in the cavity at least one ballast tank to stabilize the container when in water. In some embodiments, holes in the body enable water to fill the at least one ballast to stabilize the container when in water. In some embodiments, the holes in the body can be sealed when the at least one ballast tank is filled with air. In some embodiments, the container further includes a towing bar attachable to the container and configured to pull the container so that the container rolls on the curved track.

According to one aspect, a container ball includes a body, the body being one of spherical and ellipsoidal in shape, the body having an insulated wall and a cavity, and a rotatable track wrapped around the body and upon which the body is able to be rolled. In some embodiments, the container ball may include a ballast tank that may be filled at least in part with a gas. In some embodiments, the container ball may include a ballast tank that may be filled at least in part with a liquid. In some embodiments, the container ball may further include a leash attached to the body, the leash having a braking mechanism.

According to another aspect, a container carrier is configured to hold a container having a curved track wrapping around the body of the container and upon which the body is able to be rolled. The container carrier includes a basket configured to receive the container, a cage configured to secure the container in the basket, and a trailer hitch tube coupled to the basket to enable the container carrier to be hitched to a standard hitch receiving tube on a motor vehicle. In some embodiments, the container is orientable within the basket and cage to enable opening at least one hatch of the container when the container is in the container carrier. In some embodiments, the container is orientable within the basket and cage so that the curved track has an axis that is perpendicular to an axis of the trailer hitch tube when the container is in the container carrier.

BRIEF DESCRIPTION OF THE DRAWINGS

Embodiments described herein, and the attendant advantages and features thereof, will be more readily understood by reference to the following detailed description when considered in conjunction with the accompanying drawings wherein.

DETAILED DESCRIPTION

Figure 1:
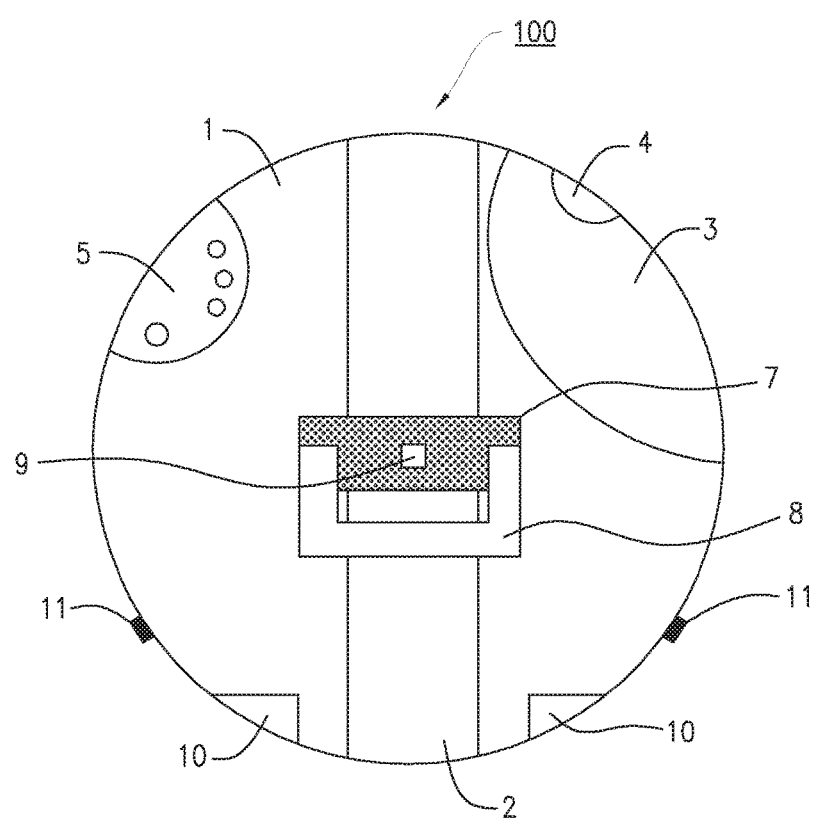
FIG. 1 illustrates a first view of a container constructed in accordance with principles set forth herein.

Before describing in detail exemplary embodiments, it is noted that the embodiments reside primarily in combinations of apparatus components and processing steps related to towable, floating containers. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments include a container ball that is a spherical insulated container for storing consumables that can easily be transported, can easily roll and be maneuvered over rough and smooth surfaces, can float in both fresh and salt water while maintaining a desirable center of balance, while providing easy access to contents.

One advantage of the container is maneuverability and convenience in handling which is the result of a rotating curved track that wraps around a circumference of the container ball that allows the container to roll. In contrast to an external or protruding set of wheels, the rotating curved track allows the container to easily pivot about a single point where the track makes contact with the surface upon which it rolls, while maintaining balance and uniform moment of inertia. The rotatable curved track may be in contact with a series of internal rollers or gears that are around the circumference of the container. Note also that the rotatable curved track has a width and flatness that is chosen to reduce any tendency of the insulated container to roll to one side.

The container can be pulled by a detachable leash that plugs into a receptor that may be located at a handle mount at about one half the height of the container. The detachable leash may have a handle on the loose end that has a button that can be depressed by a user's thumb. Depression of the button enables a pulse of air that runs through an air tube contained in the leash. The pulse of air actuates a braking mechanism that applies frictional resistance to the undersurface of the curved track. Braking allows a user to slow or stop motion of the container when pulling the container along smooth surfaces so the container does not bump into the user. Note that pump action of the handle may be employed to pump air into one or more ballast tanks. In addition, in the alternative, a pressurized gas cylinder, such as a $CO_2$ or air cylinder may be provided to discharge gas into a ballast tank.

Access to the interior of the container is by means of two different hatches. A large hatch allows convenient access to the interior for loading ice and consumables into the container. This large hatch may be secured with a rotating latch that locks the large hatch into a closed position. A small hatch is intended to allow convenient access to the contents of the container when it floats in the water with minimal risk of accidentally spilling contents or allowing water to flow into the container when the container is floating in water. The small hatch may be a round twist-off hatch that bowling ball style thumb and finger holes to allow user to twist off the hatch while holding onto the container.

Another feature of the container is a set of retractable feet that can be deployed to raise the container's rotatable curved track off the ground so that it remains stationary. Each pair of retractable feet can be deployed and retracted by means of pulling a lever. Four separate watertight hatches may open to deploy the feet and to conceal the feet when retracted.

The container may have drain holes and plugs located at a base of the container below the feet levers to allow water to drain from the interior of the container. In some embodiments, there are 12 small flood/drain holes located in the bottom hemisphere of the container that connect to small internal ballast tanks. These tanks can be flooded when the container does not have enough contents to provide sufficient weight to stabilize the container in water. Ideally, the container should float with the water line at the equator of the container. In contrast, the ballast tanks can be sealed internally with plugs in order to hold air when the container is loaded with heavy contents stabilize the buoyancy of the container in water.

An optional component is a container carrier that includes a steel basket and cage for transporting the container on the back of an automobile. The basket has an insert that securely plugs into a standard receiver hitch tube that is fixed to the vehicle. The container can be lifted by its handles and placed in the basket and secured by folding steel cage straps. The cage straps may be hinged to the basket. When the cage straps are locked into place over the container via a latching mechanism, both the small hatch and the large hatch are accessible. The container may be oriented in the basket so that the rotatable curved track is parallel to the receiver hitch.

FIG. 1 illustrates a first view of a container 100 constructed in accordance with principles set forth herein. The container 100 has an insulated body 1 enclosing a cavity to hold cold consumables. The insulated container is curved with a curved, rotatable track 2 wrapping around the body 1 and upon which the body 1 is able to be rolled. In some embodiments, the curved track is removable. The insulated container 100 has a large hatch 3 that is hinged at a lower edge to allow convenient access to the interior of the insulated container 100 in order to load the insulated container with ice and consumables such as drinks, for example, or in order to load hot consumables such as sandwiches, for example. The large hatch 3 is equipped with a latch 4 that release-ably locks the hatch 3 into a closed position. In some embodiments the insulated container 100 is spherical or elliptical in shape.

A small porthole hatch 5 is intended to allow convenient access to remove contents of the insulated container 100 when the insulated container 100 floats in water. The small hatch 5 is small to minimize risk of accidentally spilling contents of the insulated container and to minimize risk of water flooding the cavity enclosed by the body 1. Small hatch 5 may twist to open or close the small hatch 5. Attached to either side of the body 1 are handle mounts 7 to which handles 8 are connected. In either or both of two handle mounts 7 is a receptor 9 which receives a leash.

Four watertight hatches 10 may be configured to deploy four retractable feet which may be deployed using deployment/retraction levers 11. When the retractable feet are deployed, the insulated container 100 rests on the feet and the rotatable curved track 2 is off the ground.

Figure 2:
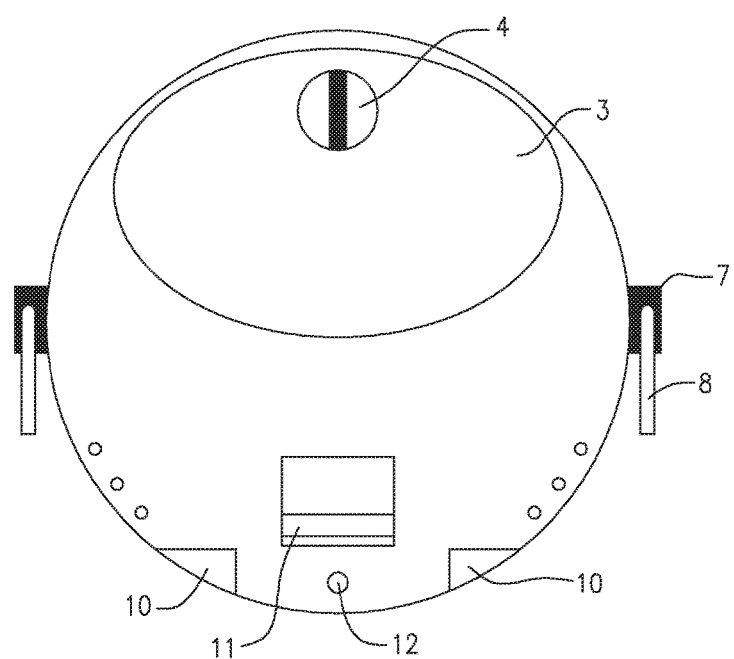
FIG. 2 is a second view of an embodiment of a container.

FIG. 2 is a second view of the insulated container 100 perpendicular to the first view of FIG. 1. FIG. 2 shows the latch 4 in the large hatch 3, the handle mounts 7 and handles 8, and the watertight hatches 10 that are configured to store retractable feet upon which to rest the insulated container 100, the retractable feet being deployed or retracted by a lever 11. FIG. 2 also shows drain plugs 12 which plug a drain hole to allow water to be drained from the insulated container 100.

Figure 3:
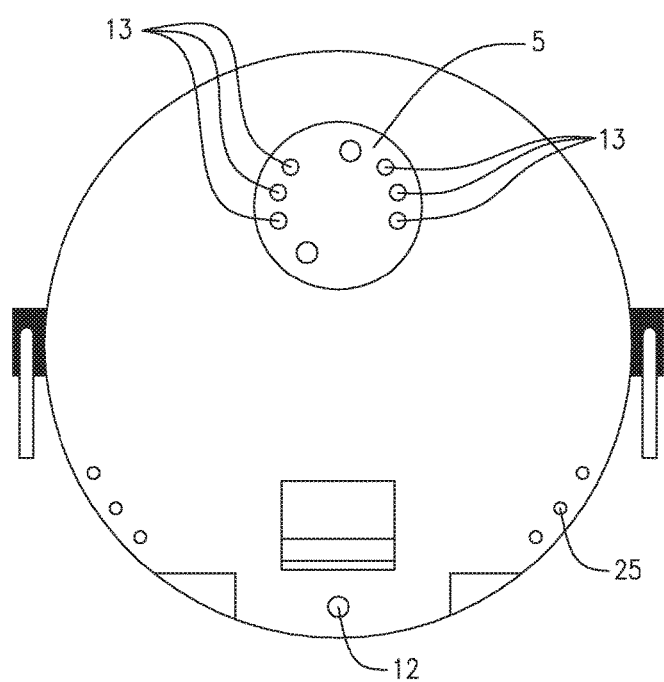
FIG. 3 is a third view of an embodiment of the container.

FIG. 3 is a side view of the insulated container 100 that is opposite of the side view of FIG. 2. FIG. 3 shows that small hatch 5 has holes 13 for fingers and thumb to grasp and open and close the small hatch 5. The holes 13 may accommodate both right-handed and left-handed users.

Figure 4:
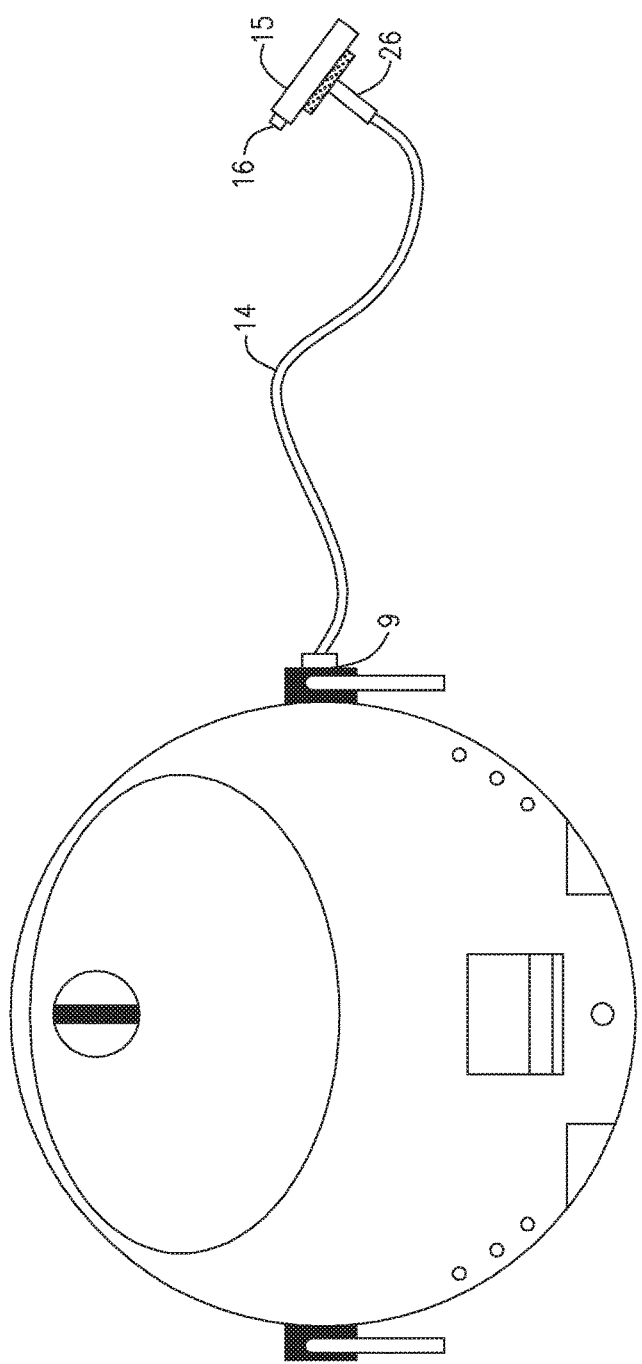
FIG. 4 is a view of a container connected to a leash.

FIG. 4 is a side view of the insulated container 100 showing a leash 14 connected to the receptor 9 at a first end. The leash 14 has a pump 15 at an opposite end. The pump 15 has a button 16 and possibly a gas cylinder 26 to inflate ballast tanks. In some embodiments, the leash 14 encloses an air tube that conducts a pulse of air created by depressing the button 16. The pulse of air actuates a mechanism (not shown), such as a brake pad or gear lever, that brakes rollers or gears of the rotatable curved track to stop or retard the motion of the insulated container 100. The pump 15 may also be employed to pump air into ballast tanks 18. In an alternative embodiment, the air tube could instead be a tube carrying a liquid such as hydraulic fluid responsive to an actuator to provide hydraulic braking of the insulated container 100.

Figure 5:
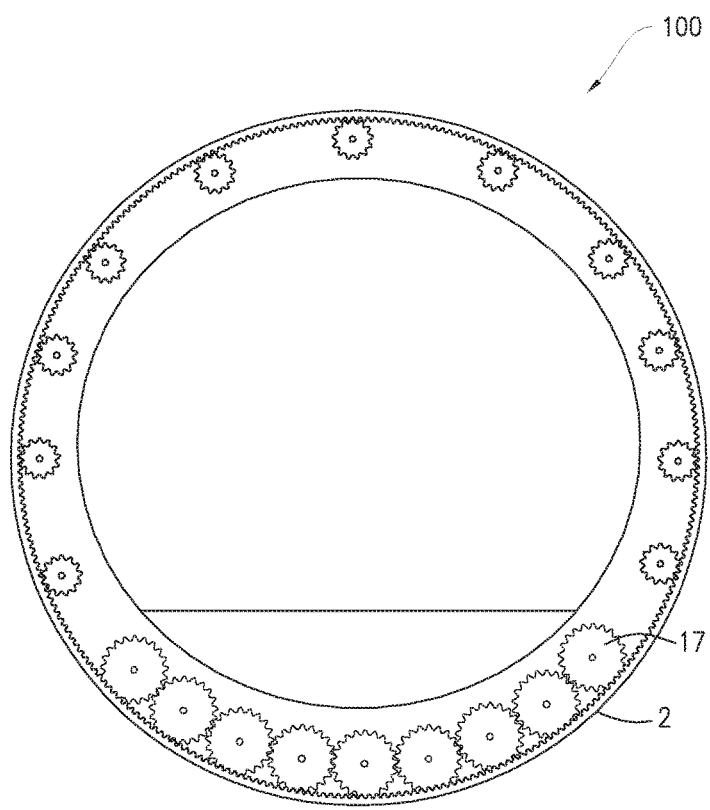
FIG. 5 is a side view showing a rotatable curved track and gears.
Figure 6:
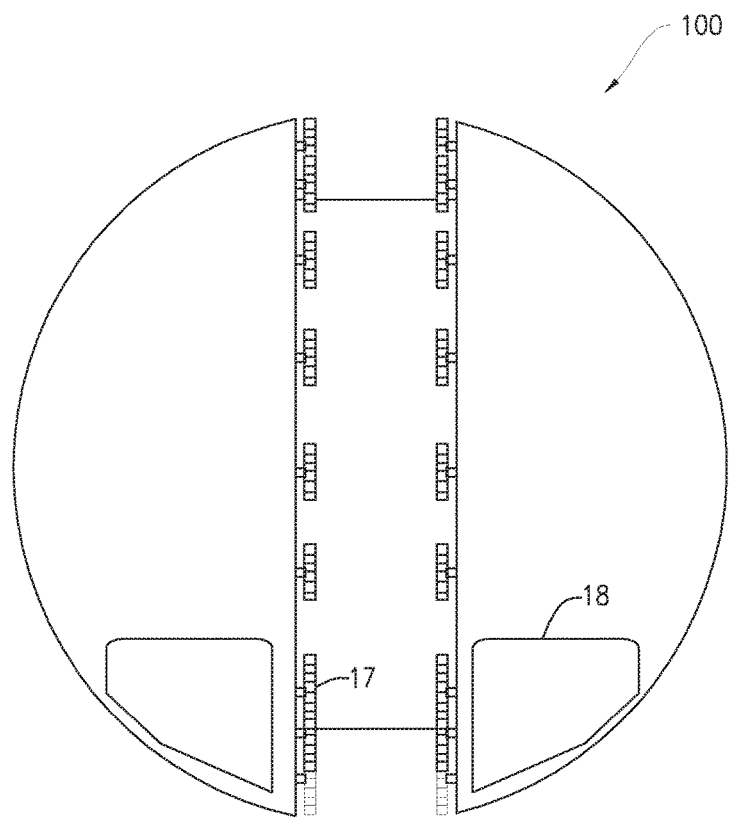
FIG. 6 is a front view showing gears that mesh with a rotatable curved track.

FIG. 5 is a side view showing the rotatable curved track 2 having gear teeth that mate with gear teeth of gears 17 so that when the insulated container 100 is being pulled by the leash 14, gears 17 rotate about their axes. FIG. 6 is a front view of the insulated container 100 showing the gears 17 and ballast tanks 18. In some embodiments, the gears 17 may be replaced by rollers, such as rubber wheels, and the gear teeth of the rotatable curved track 2 may be replaced by a roller, such as a rubber wheel. When the rotatable curved track 2 makes contact with a surface such as a surface of the earth and is pulled by the leash 14, the insulated container 100 may pivot about the point of contact and roll along the surface.

Figure 7:
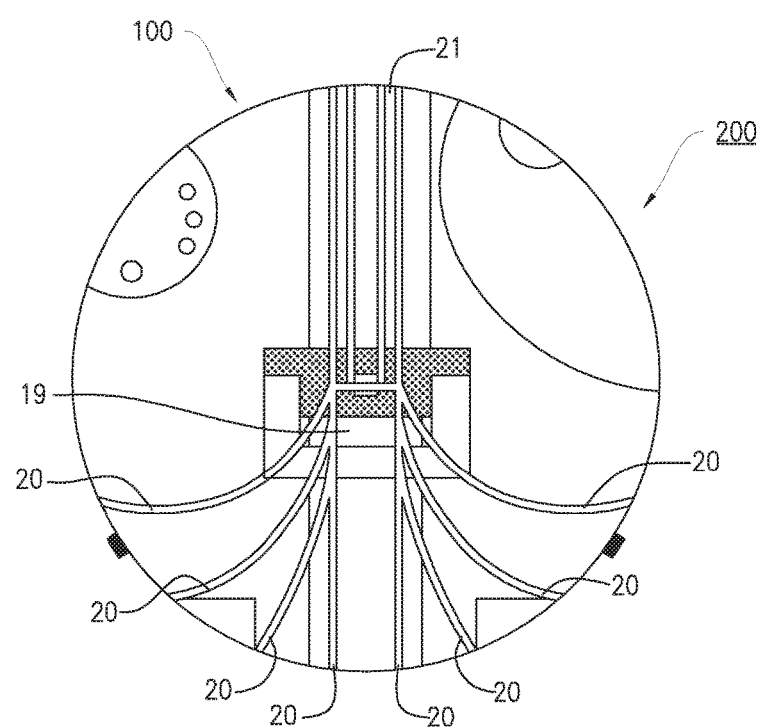
FIG. 7 is view of a container in a container carrier.

FIG. 7 is view of the insulated container 100 in an insulated container carrier 200 having a basket with a hinge 19 and cage ribs 20 configured to receive and hold the insulated container 100. Cage strap 21 is hinged to the cage ribs 20.

Figure 8:
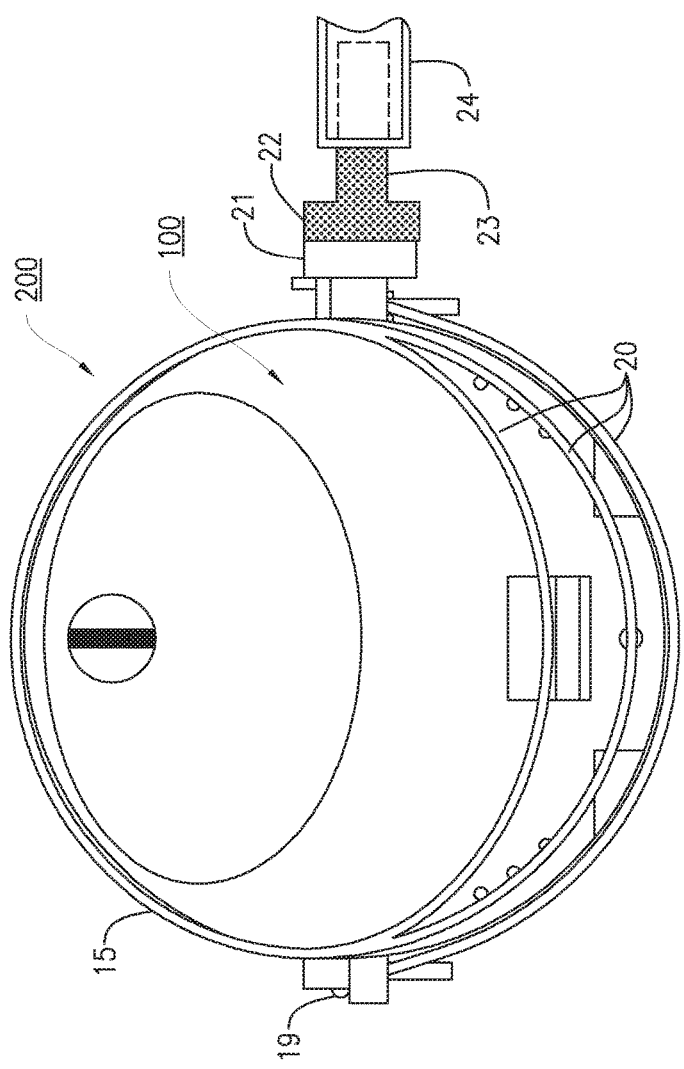
FIG. 8 is a view of the container carrier mounted to a vehicle hitch.

FIG. 8 is a view of the insulated container 100 in the insulated container carrier 200. The insulated container carrier 200 is configured to mount to a receiver hitch of an automobile. The basket has a latching mechanism 21 that enables attachment of a plate 22 that is fixed to the steel basket. The plate 22 may be affixed to an insert 23 that inserts into a receiver hitch 24 of an automobile so that the insulated container 100 and insulated container carrier 200 can be mounted to the back of the automobile.

Thus, the insulated container 100 can be lifted up via its handles 8 and placed in the steel basket and secured by folding the straps 20 of the basket over the insulated container 100 and locking the straps 14 into place. The cage 21 is hinged by hinge 19 to the basket. When the insulated container 100 is in the insulated container carrier 200, both the insulated containers hatches 3 and 5 are accessible and the rotatable curved track has a center axis that is perpendicular to an axis of the receiver hitch 24.

The insulated container 100 also has drain holes 25 located at or near the bottom of the insulated container 100 that connect to small internal ballast tanks 18. The ballast tanks 18 may be flooded when the insulated container 100 does not have enough content weight to stabilize the insulated container when it floats. Ideally, the insulated container 100 may float with the water line at the equator of the insulated container 100. In contrast, the ballast tanks 18 can be sealed with plugs in order to hold air when the insulated container 100 has heavy contents in order to stabilize the buoyancy of the insulated container 100 in water.

Figure 9:
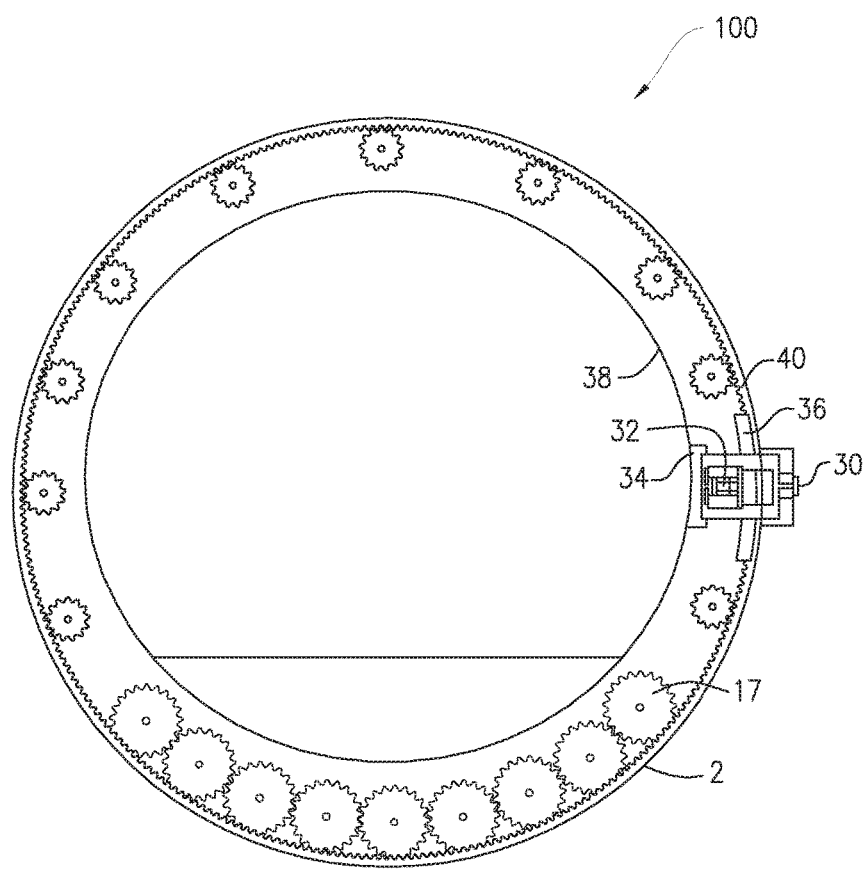
FIG. 9 is a view of a braking mechanism.

FIG. 9 shows a view of the braking mechanism that is activated by a pulse of air from the actuator 15 conducted to a receiver 20 which transmits pressure to a cylinder 32, which applies force to brake pads 36. Element 34 is a mounting bracket that supports the braking mechanism. Brake pads 36 press against surfaces 38 and 40 to brake the rotation of the insulated container 100. When the actuator 15 is depressed a pulse of air impinges on the cylinder 32 which forces the brake pads 36 against surfaces 38 and 40.

Figure 10:
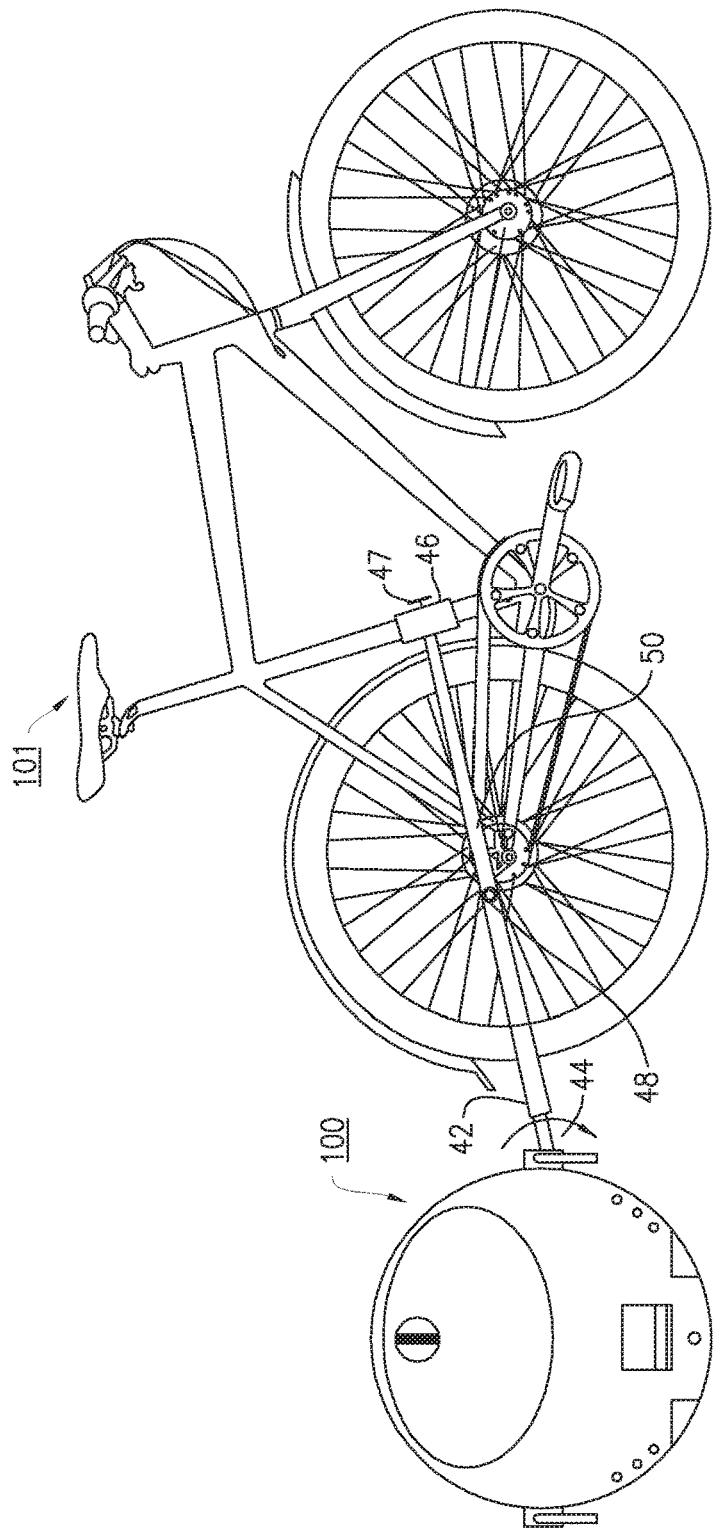
FIG. 10 is a side view of a towing bar connected to a bicycle.
Figure 11:
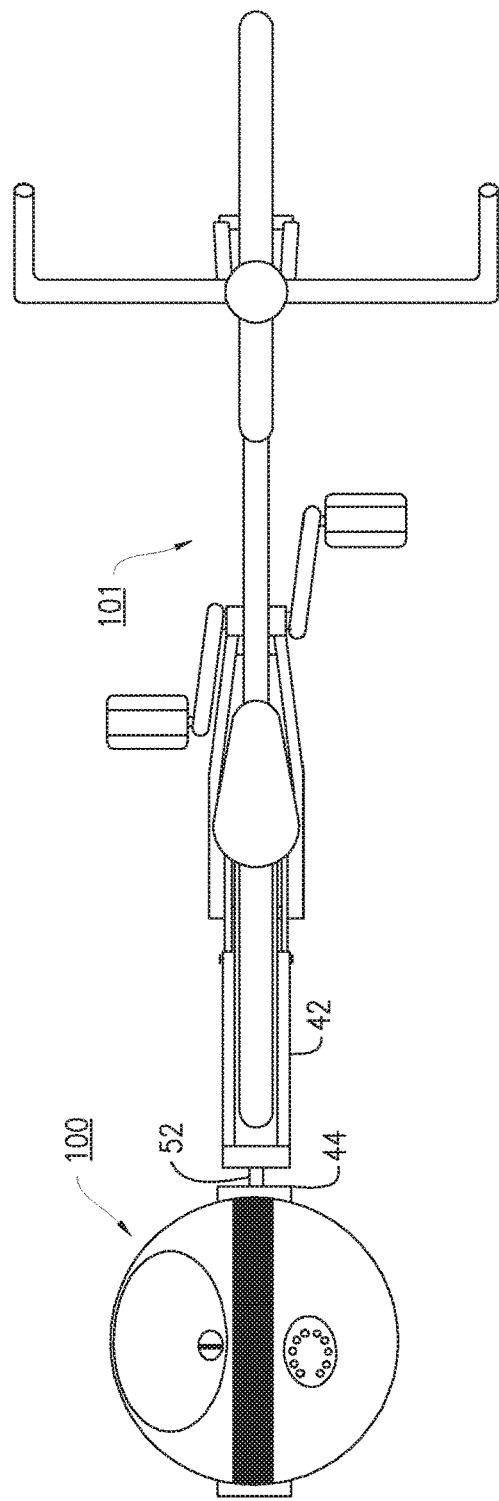
FIG. 11 is a top view of the towing bar and bicycle.
Figure 12:
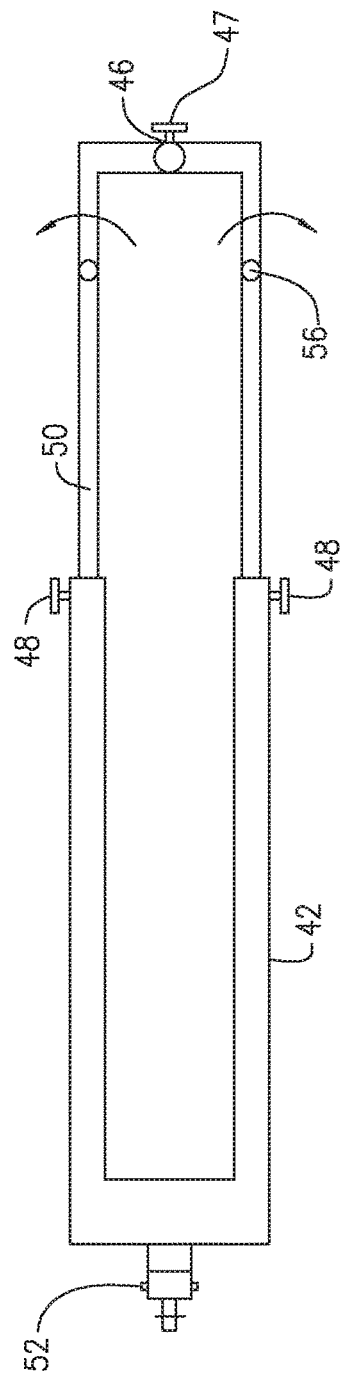
FIG. 12 is a top view of the towing bar.

FIG. 10 is a side view of an insulated container 100 being towed by a bicycle 101 by a towing bar 42. The towing bar 42 is coupled to the insulated container 100 at a pivoting connection 44. The towing bar 42 is attached to the bicycle by knobs 48 and a collar 46 which has a tightening knob 47. In some embodiments, the collar 46 is a clamp with two parts that are held in place on the bicycle's seat tube with the tightening knob 47. The towing bar 42 has a telescoping bar 50 which may extend and retract to adjust to different sized bicycles. FIG. 11 is a top view of the insulated container 100, bicycle 101 and towing bar 42. The towing bar 42 is coupled to the pivoting connection 44 by a joint 52. Joint 52 allows for pitch and roll about a longitudinal access of the towing bar 42 without allowing yaw motion. FIG. 12 is a top view of the towing bar 42 with joint 52 and connection pin, tightening knobs 48 and 47, collar 46 and telescoping bar 50. Also, the telescoping bar 50 of the towing bar 42 has a pivot joint 56 that enables pivoting of the telescoping bar 42.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An insulated container configured to store consumables, the container comprising:
    a body having an insulated wall that encompasses a cavity, the cavity configured to hold consumables;
    a curved track configured to wrap around the body and upon which the body is able to be rolled, the curved track including a curved band wrapping around the body, the curved band having interior gear teeth that are continuous around a periphery of the curved band and that mate with teeth of a plurality of interior gears attached to the body, such that the curved track moves relative to the body;
    a leash attachable to the container and configured to pull the container so that the container rolls on the curved track, the leash having a first end attachable to the container, a second end opposite the first end and having a pump, and an air conduit along a length of the leash, the pump facilitating sending a pulse of air through the air conduit and wherein the container further comprises a braking mechanism actuated by the pulse of air to brake the container; and
    a ballast tank configured such that the pump and air conduit are configurable to pump air into the ballast tank.

2. The container of claim 1, wherein the curved track is one of spherical and ellipsoidal.

3. The container of claim 1, further comprising:
    a first hatch openable to load and unload the container; and
    a second hatch smaller than the first hatch and openable to retrieve consumables from the cavity.

4. The container of claim 3, wherein the second hatch has recesses to receive fingers of a hand to enable opening of the second hatch.

5. The container of claim 1, further comprising retractable feet extending from the body upon which the container rests when the retractable feet are extended.

6. The container of claim 5, wherein the retractable feet are extendible and retractable by operation of at least one lever.

7. The container of claim 1, wherein the body is configured to float in water.

8. The container of claim 7, wherein the body has in the cavity at least one ballast tank to stabilize the container when in water.

9. The container of claim 8, further comprising holes in the body to enable water to fill the at least one ballast tank to stabilize the container when in water.

10. The container of claim 1, further comprising a towing bar attachable to the container and configured to pull the container so that the container rolls on the curved track.

11. An insulated container ball, comprising:
- a body, the body being one of spherical and ellipsoidal in shape, the body having an insulated wall that encompasses a cavity; and
- a rotational mechanism disposed around the body and upon which the body is able to be rolled, the rotational mechanism having gear teeth that are continuous around a periphery of the rotational mechanism and that mate with teeth of a plurality of interior gears attached to the body, such that the curved track moves relative to the body;
- a leash attachable to the insulated container ball and configured to pull the insulated container ball so that the insulator container ball rolls on the curved track, the leash having a first end attachable to the container, a second end opposite the first end and having a pump, and an air conduit along a length of the leash, the pump facilitating sending a pulse of air through the air conduit and wherein the container further comprises a braking mechanism actuated by the pulse of air to brake the insulated container ball; and
- a ballast tank configured such that the pump and air conduit are configurable to pump air into the ballast tank.

12. The insulated container ball of claim 11, wherein the rotatable mechanism includes a removable track.

13. The insulated container ball of claim 11, wherein the rotational mechanism includes rubber wheels rotatably mounted on the insulated container ball.

14. The insulated container ball of claim 11, further comprising a ballast tank that may be filled at least in part with a gas.

* * * * *